(12) United States Patent
Suhr et al.

(10) Patent No.: US 11,070,294 B2
(45) Date of Patent: Jul. 20, 2021

(54) OPTICAL TRANSMISSION SYSTEMS, RECEIVERS, AND DEVICES, AND METHODS OF RECEIVING OPTICAL SIGNALS

(71) Applicant: Bifrost Communications ApS, Kongens Lyngby (DK)

(72) Inventors: Lau Frejstrup Suhr, Copenhagen (DK); Guillermo Silva Valdecasa, Copenhagen (DK); Jose Antonio Altabas Navarro, Copenhagen (DK); Jesper Bevensee Jensen, Albertslund (DK); Michele Squartecchia, Søborg (DK)

(73) Assignee: Bifrost Communications ApS, Kongens Lyngby (DK)

( * ) Notice: Subject to any disclaimer, the term of this patent is extended or adjusted under 35 U.S.C. 154(b) by 0 days.

(21) Appl. No.: 16/987,486

(22) Filed: Aug. 7, 2020

(65) Prior Publication Data
US 2021/0044361 A1    Feb. 11, 2021

Related U.S. Application Data

(60) Provisional application No. 62/883,846, filed on Aug. 7, 2019.

(51) Int. Cl.
*H04B 10/61*     (2013.01)
*H04B 10/2507*   (2013.01)

(52) U.S. Cl.
CPC ... *H04B 10/6164* (2013.01); *H04B 10/25073* (2013.01); *H04B 10/6165* (2013.01)

(58) Field of Classification Search
CPC .......... H04B 10/6164; H04B 10/25073; H04B 10/6165; H04B 10/6161; H04B 10/64
(Continued)

(56) References Cited

U.S. PATENT DOCUMENTS

| 5,880,870 A | * | 3/1999 | Sieben | H04B 10/58 |
|---|---|---|---|---|
|  |  |  |  | 398/183 |
| 7,209,660 B1 | * | 4/2007 | Yee | H04B 10/50 |
|  |  |  |  | 398/141 |

(Continued)

FOREIGN PATENT DOCUMENTS

WO    20070129403 A2    10/2007

OTHER PUBLICATIONS

Keerthan, et al. Design of cascaded all pass network with monotonous group delay response for broadband radio frequency applications, IET Microw. Antennas Propag., 2016, vol. 10, Iss. 7, pp. 808-815.

(Continued)

*Primary Examiner* — Abbas H Alagheband
(74) *Attorney, Agent, or Firm* — Law Office of Michael Antone; Michael Antone

(57) ABSTRACT

Optical receivers including at least one local oscillator providing local oscillator light at a local oscillator center frequency offset from a received optical signal by a frequency difference. A combiner for combining the optical signal with the local oscillator light and to output at least one combined optical signal. An opto-electrical converter downconverts the combined optical signal into corresponding RF electrical signal at the frequency of the frequency difference. A filter may be provided to at least substantially remove one of the upper and lower electrical signal sidebands to output one of a VSB and SSB RF signal before rectification. A local oscillator frequency controller may adjustably control the local oscillator frequency to provide the difference frequency that produces a specified group delay in the RF electrical signal that may be specified via optical receiver performance parameters and/or user input and offset using a group delay filter.

20 Claims, 15 Drawing Sheets

(58) Field of Classification Search
USPC .......................................................... 398/208
See application file for complete search history.

(56) References Cited

U.S. PATENT DOCUMENTS

| | | | | |
|---|---|---|---|---|
| 7,330,667 | B2* | 2/2008 | Fells | H04B 10/58 398/158 |
| 7,447,436 | B2* | 11/2008 | Yee | H04B 10/50 398/152 |
| 7,536,108 | B2* | 5/2009 | Hirano | H04B 10/25133 398/147 |
| 8,463,142 | B2* | 6/2013 | Zhao | H04B 10/69 398/204 |
| 8,706,784 | B2 | 4/2014 | Chou | |
| 8,995,844 | B2* | 3/2015 | Schemmann | H04B 10/613 398/183 |
| 10,367,588 | B2 | 7/2019 | Jensen et al. | |
| 2006/0291868 | A1 | 12/2006 | Yee | |
| 2013/0136451 | A1* | 5/2013 | Yoshida | H04B 10/5053 398/65 |
| 2019/0280774 | A1* | 9/2019 | Nazarathy | G02B 6/29362 |
| 2019/0393964 | A1* | 12/2019 | Tehrani | H04B 10/60 |

OTHER PUBLICATIONS

RFWorld, SSB vs VSB | Difference between SSB and VSB modulation types, at least as early as Aug. 19, 2019, https://www.rfwireless-world.com/Terminology/SSB-modulation-vs-VSB-modulation.html.

Fabrega, J N, et al: Experimental demonstration of Heterodyne Phase-Locked Loop for optical homodyne PSK receivers in PONs, Transparent Optical Networks, 2008. ICTON 2988. 19th Anniversary Intentional Conference, Piscatanay, NJ, USA, (Jun. 22, 2008), pp. 222-225.

Gnauck A H et al: • Linear microwave-domain dispersion compensation of 10-Gb/s signals using heterodyne detection, 2005 Optical Fiber Communications Conference Technical Digest (IEEE Cat. No. C5CH37672) IEEE Piscataway, NJ, USA, IEEE, vol. 6, (2005-03-96), pp. 91-93.

McCarthy M E et al: Electronic dispersion compensation utilising full optical field estimation, The Mediterranean Journal of Electronics & Communications, Softmotor Ltd, GB, vol . 3, No. 4, Jan. 1, (Jan. 1, 2007) pp. 144-151.

* cited by examiner

OPTICAL TRANSMISSION SYSTEMS, RECEIVERS, AND DEVICES, AND METHODS OF RECEIVING OPTICAL SIGNALS

CROSS-REFERENCE TO RELATED APPLICATIONS

The application claims the benefit of and priority to U.S. Provisional Patent Application Ser. No. 62/883,846 filed Aug. 7, 2019, which is incorporated herein by reference in its entireties.

BACKGROUND OF THE INVENTION

Field of the Invention

The present invention generally relates to communication systems and receivers with improved performance. More specifically, the inventive systems and receivers enable the reception of information from a standard (i.e., double/dual-sideband) modulated optical signal using a single sideband of an electrical signal generated from the optical signal and/or provide adjustable/tunable electrical dispersion and other distortion compensation for single or dual sideband optical signals.

Background Art

The efficient generation, transmission, reception of signals carrying the information over networked communication systems underpins modern society. The ability to expand the reach and information carrying capacity of these communication systems is directly related to the cost of the system. The continued expansion of the reach and capacity enables the delivery of additional services over the network, which, in turn, drives additional expansion. In order to increase the information transmission rates in these systems, it is necessary to overcome a wide variety of transmission impairments, such as interference within and between information channels in the system.

The transmission impairments become more significant as the transmission rates increase and the number of information channels in a system increases. For example, in optical systems, the material and the design of the standard single mode fibers (SSMF) causes light of different wavelengths to propagate with different group velocities through the fiber, which is known as chromatic dispersion. FIG. 1 shows how the chromatic dispersion varies with optical wavelength in the most commonly used optical fiber in optical communication systems, standard single mode fiber (SSMF), which usually have the zero dispersion region around 1310 nm wavelength and a dispersion value of approximately 17 ps/(nm km) in the C band around 1550 nm wavelength. The chromatic dispersion leads to a broadening of the transmitted pulses, due to the different optical components arriving at different times at the receiver, and therefore causing inter-symbol interference (ISI). Higher symbol rates have broader spectra leading to higher velocity difference between the spectral components in the signal. In addition, the amount of pulse broadening that can be tolerated before it becomes decremental to the received signal quality decrease with higher symbol rate, since each symbol is allocated a shorter time slot.

FIG. 2A shows the pulse broadening effect and the ISI. FIG. 2B shows plots of frequency response for an intensity modulation/direct detection (IM/DD) link with SSMF of 10 km, 20 km, 30 km, 40 km, 50 km and 100 km, assuming D=18 ps/(nm km) and λ=1550 nm as calculated by Neto et al. in "Simple Estimation of Fiber Dispersion and Laser Chirp Parameters Using the Downhill Simplex Fitting Algorithm," J. Lightwave Technol. 31, 334-342 (2013).

Chromatic dispersion is just one of the transmission impairments that must be addressed in order to provide robust communication systems. While transmitter, receivers, and the other devices used in communication systems may be designed to compensate, at least in part, for the impairments, in many applications, the cost of such systems is not economical.

As such, there is a continuing need for communications systems with lower cost and higher performance to enable systems with greater information transmission capacities to be deployed throughout the network. This need is particularly acute in metro and access networks, where the deployment of high cost, high performance systems is not financially feasible.

BRIEF SUMMARY OF THE INVENTION

The present invention addresses the above noted needs by providing communication systems, devices, and methods that enable lower cost, higher performance systems through the use of receivers that compensate for optical transmission impairments in the electrical domain.

In various embodiments, one or more optical receivers may be employed in an optical communication system in which optical double sideband signals are transmitted by one or more optical transmitters. The optical receivers may employ optical heterodyne detection to produce an electrical radio frequency double side band signal. One or more sideband filters may be provided in the receiver to substantially reduce the presence of one sideband to yield a vestigial sideband signal (VSB), or to essentially eliminate the presence of one sideband to produce a single sideband signal (SSB). While the substantial elimination of one of the sidebands removes a portion of the information carrying signal, the inventors have found that substantial elimination of one sideband may reduce the negative impact of optical transmission impairments on the performance of the receiver and the system.

Various optical system and optical receiver embodiments may include:
- one or more local oscillators, each providing light at a local oscillator frequency;
- at least one coupling device to couple an optical signal having a center frequency with upper and lower sidebands carrying information with the light from the local oscillators to provide a combined optical signal;
- one or more opto-electrical converters, e.g., photodiodes, having a predefined frequency bandwidth, to receive the combined optical signal and output a RF electrical signal having upper and lower sidebands carrying the information; and
- at least one RF sideband filter to substantially filter one of the upper and lower RF sidebands to produce one of a vestigial sideband signal and a single sideband RF signal carrying the information that may be further processed.

In various embodiments, one or more optical receivers may be employed in an optical communication system in which optical single or double sideband signals are transmitted by one or more optical transmitters. The optical receivers may employ optical heterodyne detection and control the frequency difference between the center wavelength of the optical signal and the local oscillator light frequency to produce a corresponding electrical radio frequency signal in a specific frequency band where a group delay variation has been purposely introduced in the transfer function of the receiver aiming to compensate for optical transmission impairments. While the introduction of signal distortion into the heterodyne signal is counter to the general intent of down-conversion, the inventors have found that if performed according to the methods and with devices of the present invention, the signal distortion may improve the performance of the optical receivers and systems.

Various optical system and optical receiver embodiments may include:
- one or more local oscillators, each providing light at a local oscillator frequency;
- at least one combiner to combine an optical signal having a center frequency carrying information with the light from the local oscillators having a local oscillator center frequency to provide a combined optical signal; and
- one or more opto-electrical converters, e.g., photodiodes, having a predefined frequency bandwidth, to receive the combined optical signal and output a RF electrical signal carrying the information;
- where the local oscillator frequency is adjusted by a local oscillator controller to produce a frequency difference between local oscillator frequency and the optical signal center wavelength and control the frequency of the RF signal produced by the down-conversion, which, in turn, affect the performance of the RF components in the receiver, such as the passband filters, transimpedance amplifiers, and group delay filters. For example, the frequency may be controlled to introduce a group delay in the converted RF signal to compensate for chromatic dispersion in a fiber link through the use of a group delay filter or otherwise.

Various system and receiver embodiments may include one or both of VSB/SSB filtering and electrical signal distortion compensation. The optical receivers may include other components that are present in various optical heterodyne receivers, such as may be used in coherent and quasi-coherent optical transmission systems.

In addition, while the various aspects of the present invention provide for lower cost, high performance system, the teachings of present invention may be employed in other systems to improve the performance of such systems. For example, the present invention may be employed with optical systems that include various optical chromatic dispersion compensation devices, such as dispersion compensating fiber (DCF), Bragg gratings, etc.

Accordingly, the present disclosure addresses the continuing need for systems and receivers with improved cost and performance.

BRIEF DESCRIPTION OF THE DRAWINGS

The accompanying drawings are included for the purpose of exemplary illustration of various aspects of the present invention to aid explanation and understanding, and not for purposes of limiting the invention, wherein.

Figure 1:
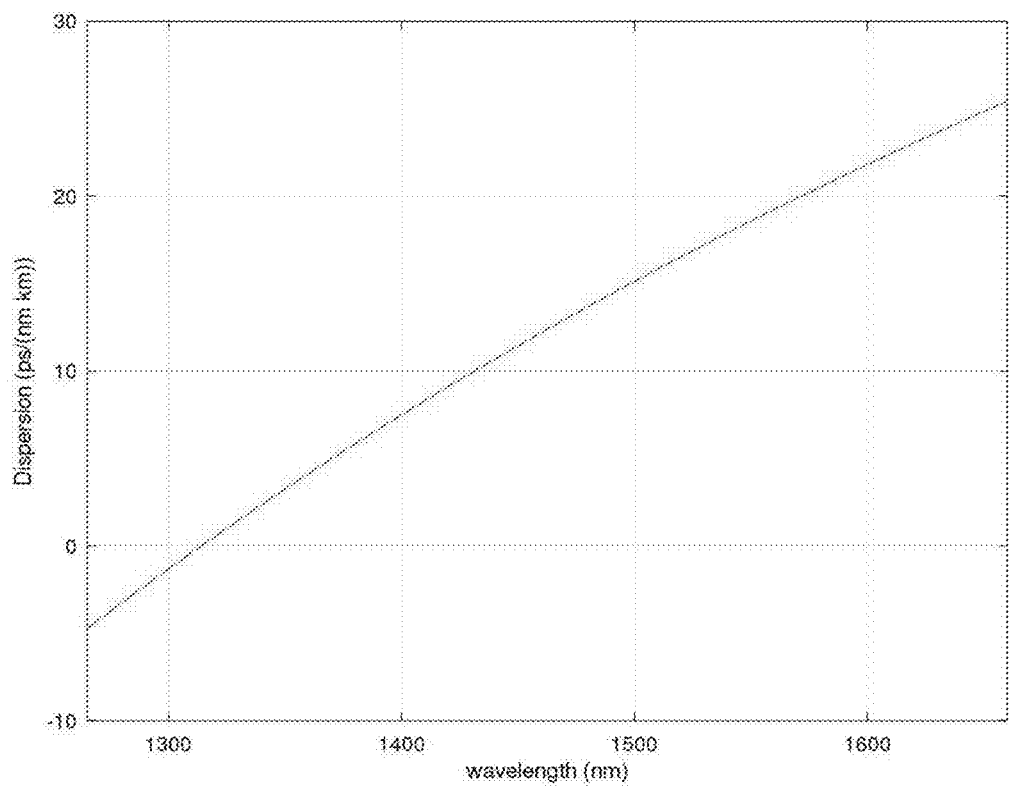
FIG. 1 is an exemplary plot showing chromatic dispersion in standard single-mode fiber as a function of wavelength.
Figure 2A:
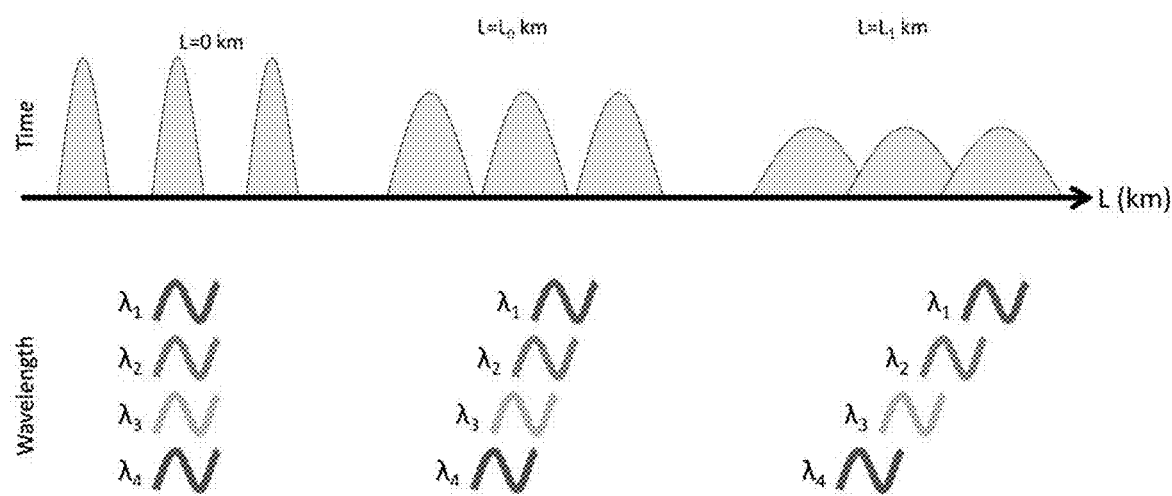
FIG. 2A depicts the impact of chromatic dispersion on an optical signal shape.
Figure 2B:
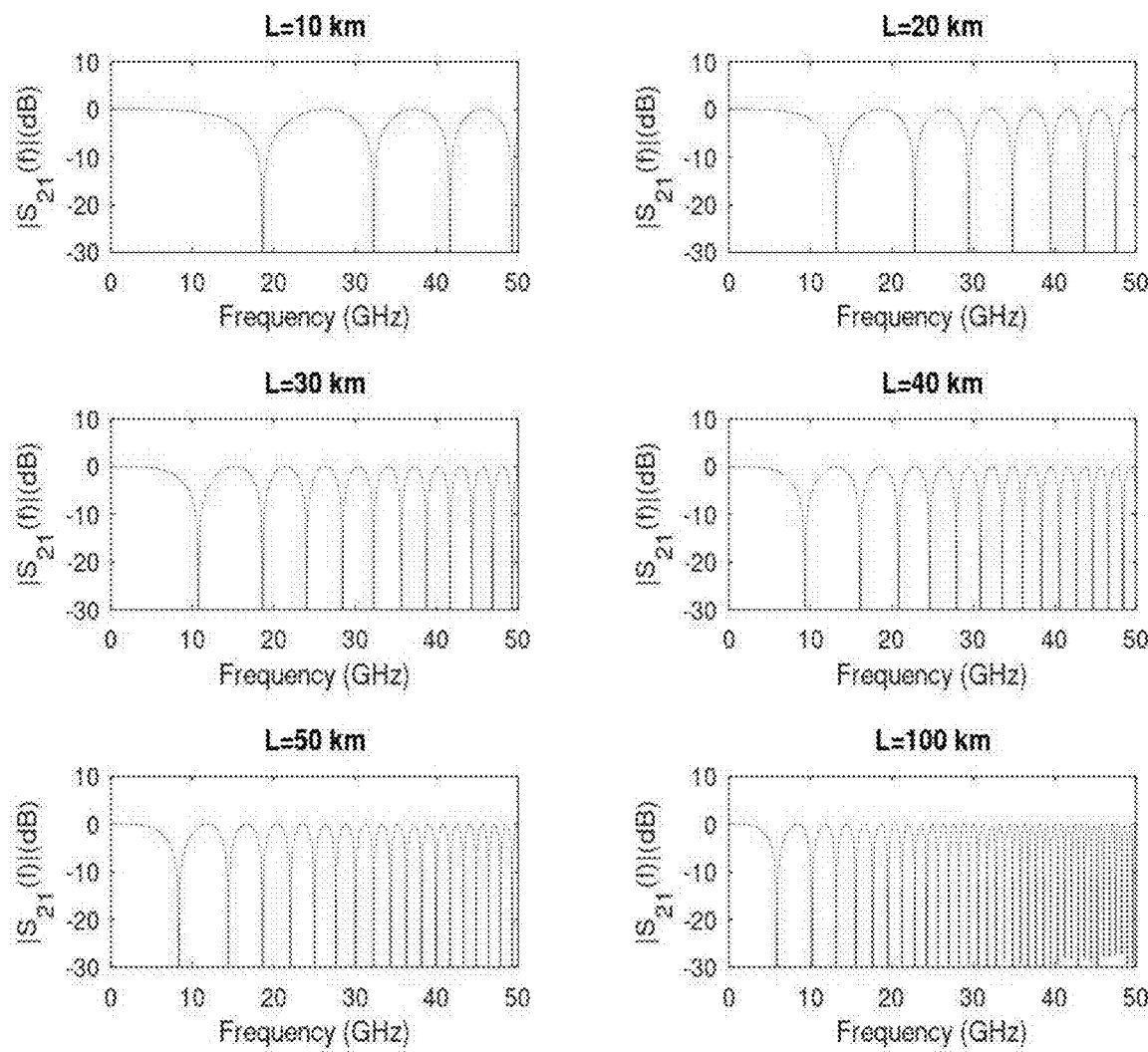
FIG. 2B show plots of frequency response for an intensity modulation/direct detection (IM/DD) link with SSMF of 10 km, 20 km, 30 km, 40 km, 50 km and 100 km, assuming a D=18 ps/(nm km) and λ=1550 nm.

In the drawings and detailed description, the same or similar reference numbers may identify the same or similar elements. It will be appreciated that the implementations, features, etc. described with respect to embodiments in specific figures may be implemented with respect to other embodiments in other figures, unless expressly stated, or otherwise not possible.

DETAILED DESCRIPTION OF THE INVENTION

Optical systems 10 of the present invention may be employed in various known configurations in uni- or bi-directional systems that may be point or multi-point to point or multi-point configurations with nodes deployed in linear, ring, mesh, and other network topologies. In general, the system 10 may be deployed using free space and/or optical fiber, but it may be appreciated that many of the applications may involve fiber optic-based systems.

Furthermore, the optical system 10 may generally support one or more wavelength channels that may be laid out in a channel grid over various ranges in the optical spectrum. For example, single channel system may be operated with a wavelength channel around 1310 nm and/or 1550 nm. While dense wavelength division multiplexed (DWDM) systems, for example, may divide the optical spectrum ranging nominally from 1490-1625 nm (S-band, C-band, L-band) into dozens of wavelength channels having fixed or variable bandwidths, such as 50 GHz, 100 GHz, etc., depending upon the design and application of the system 10. For example, the system may be defined with wavelength channels based on the ITU grid, https://www.itu.int/itu-t/recommendations/rec.aspx?rec=11482. Optical signals may be transmitted through the system 10 at wavelengths that fall within one of the wavelength channels. While the channel grid may be continuous with adjacent channels sharing a channel edge, the system 10 may provide a guard band near the channel edge. The guard band is a wavelength range that is adjacent to the channel edge in which optical signals should not be transmitted and used to reduce the amount of interference between signals in adjacent channels by maintaining a minimum separation.

Figure 3:
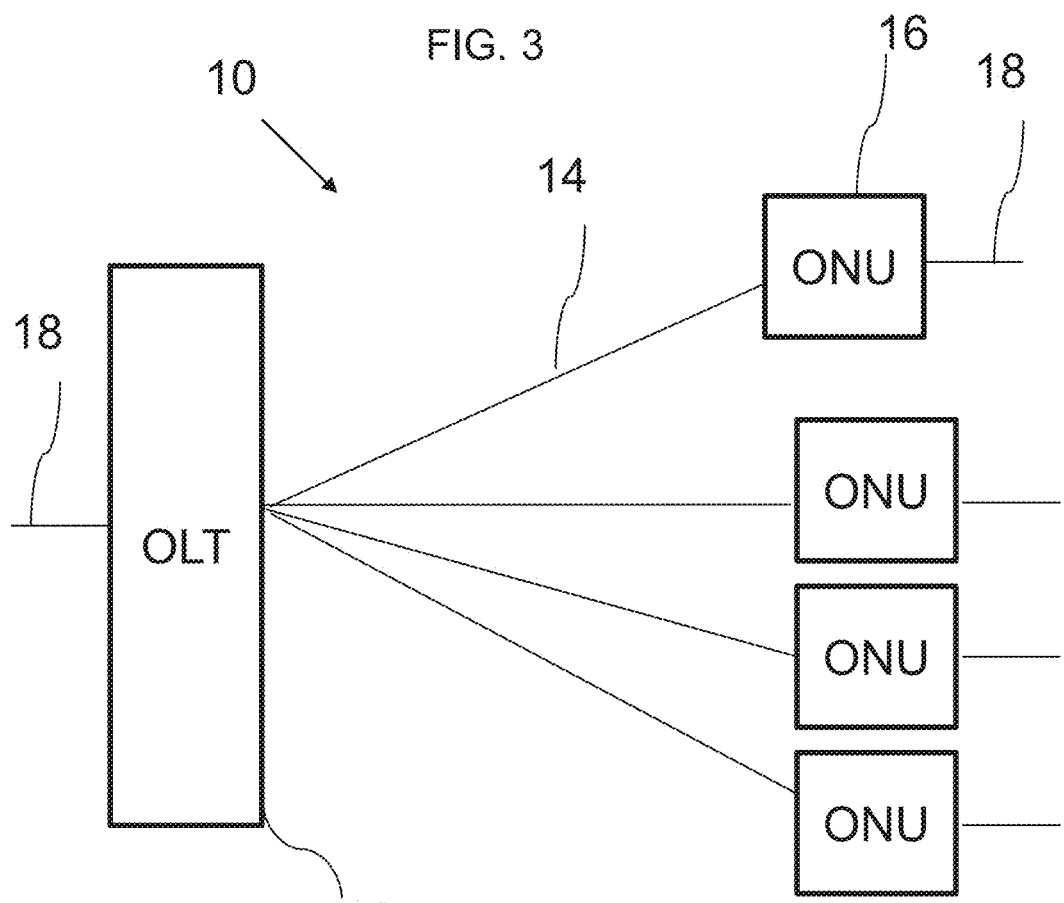
FIGS. 3-5 show exemplary optical systems embodiments.
Figure 4:
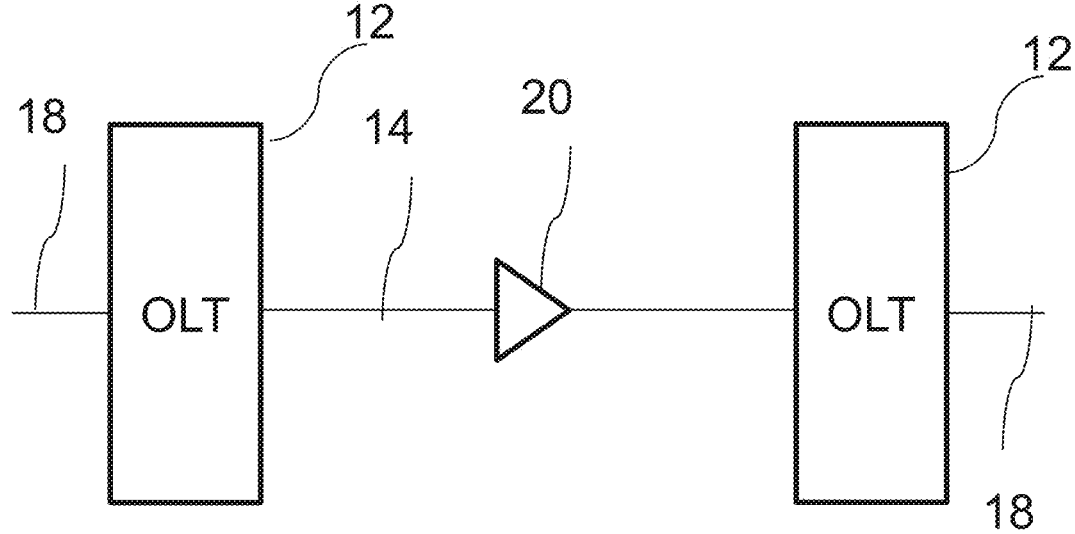

FIGS. 3 & 4 depict exemplary embodiments of optical system 10 in point to multi-point links (1) and point to point links (2) between nodes. The links may be stand-alone optical communication links or may be part of a larger network as described in the preceding paragraph in which nodes 11 may include optical line terminals or regenerators, optical network units, optical switches, add/drop multiplexers (OADM), optical amplifiers (OA), etc. in various physical and management network architectures, such as in FIG. 5.

In FIG. 3, exemplary optical system 10 embodiments may include an optical line terminal or regenerator (OLT) 12. The OLT 12 may be in uni- or bi-directional optical communication via one or more optical fibers 14 with one or more optical network units (ONU) 16. The OLTs 12 and ONUs 16 may be connected to one or more input/output lines 18, which may be optical and/or electrical depending upon the network implementation.

Figure 5:
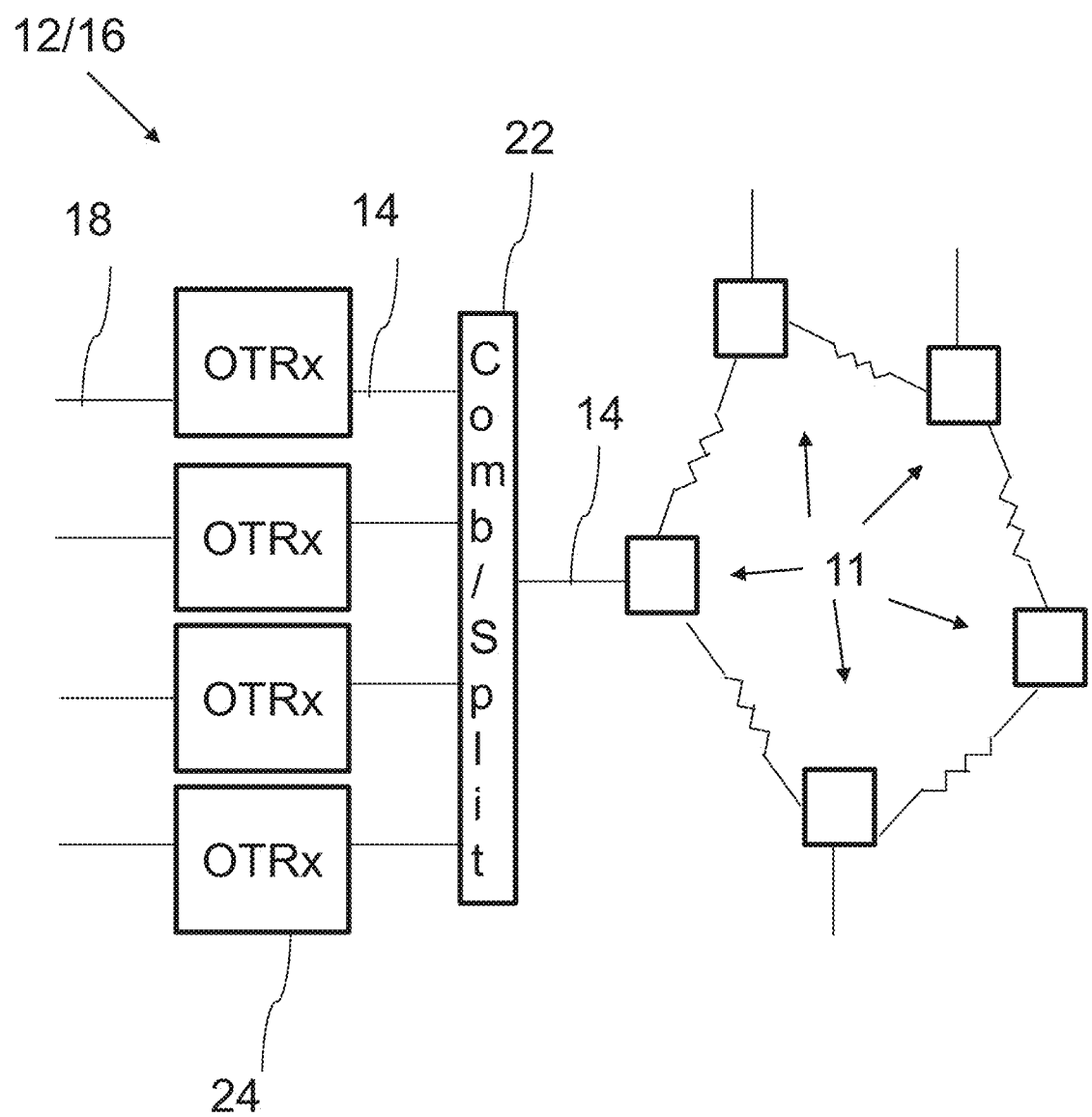

FIG. 4 shows exemplary optical system 10 embodiments including a point to point link between two OLTs 12. FIG. 3-5 embodiments may or may not include optical amplifiers 20 depending upon the network configuration.

FIG. 3-5 embodiments may be deployed in various layers in the network including the metro and access layers of the network. In the access networks including fronthaul, backhaul and aggregation, the system 10 may be operated as passive optical network ("PON") or may include line amplifiers 20 to provide amplification between the nodes and/or the nodes may include distributed amplifiers, such as Raman amplifiers.

FIG. 5 shows exemplary OLT 12 and ONU 16 node embodiments that may include an optical combiner/splitter 22 that may combine and/or split optical signals when more than one transmitter or receiver, (OTRx) 24 is used in the system 10.

The optical combiner/splitter 22 may include passive combiners and wavelength specific multiplexers and demultiplexers depending upon whether the optical system is deployed as a single wavelength and/or wavelength division multiplexed system. For example, the optical system 10 may be deployed as a time division multiplexed ("TDM"), wavelength division multiplexed ("WDM"), or time & wavelength division multiplexed ("TWDM") system in which each ONU 16 communicating with the OLT 12 may use the same or different wavelengths as will be further described herein. It will be appreciated that if a node in the system is only transmitting and/or receiving one channel and only one channel is present on the fiber link 14 connecting the nodes, then optical combiner/splitter 22 may be used in the nodes.

The transmitter or receiver (OTRx) 24 may include only transmitters or receivers, separate transmitters and receivers, or transceivers depending up the system configuration. In various embodiments, it may be cost effective to employ integrated transceivers to reduce cost, but in other embodiments it may be more desirable to employ separate transmitters and receivers, as well as to merely provide for uni-directional communication.

The optical transmitter in the OTRx 24 generally includes one or more fixed or tunable wavelength optical sources, such as narrow or broad line width lasers. Information in one or more information streams may be imparted to the light, i.e., optical carrier, emitted by the source using various methods, such as directly modulating the source, modulating the light using an external modulator, and/or upconverting electrical carriers carrying the information, to produce the optical signal carrying the information on one or more wavelengths/frequencies.

The information may be imparted using one or more modulation techniques including amplitude modulation (AM), frequency modulation (FM), phase modulation (AM), or any combination of AM, FM and PM. In addition, the information may be imparted in analog or digital format employing various modulation formats that support two or more modulation levels, e.g., "0"-states and "1" states, RZ, NRZ, etc. Advanced/higher-order/multilevel modulation formats, such as duobinary and other higher order constellations, may be used to enable more bits of information per symbol transmitted, or to allow for the use of components with a bandwidth smaller than the equivalent binary signal bandwidth. For example, a system employing four amplitude levels will be able to encode two bits per symbol, a system employing four frequency levels will be able to encode two bits per symbol, a system which independently employs four amplitude and four frequency levels will be able to encode four bits per symbol, and a duobinary or higher order other partial response system will be able to encode one or more bits per symbol using a reduced frequency spectrum. Apart from amplitude and frequency, the information may also be encoded in the phase of the carrier, in the polarization of the carrier, as variations in pulse-width and/or position, etc.

It will be further appreciated that the additional signal processing, such as forward error correction (FEC), may be performed in the information before transmission as an optical signal. In various embodiments, error correction and/or testers may be used to provide feedback to control various transmitters and receivers in the system 10.

In various embodiments, the signal may be encoded by one or more simultaneous AM and/or FM devices, such as frequency chirped lasers, directly modulated laser (DML), externally modulated laser (EML), vertical cavity surface emitting laser (VCSEL), etc. Both DMLs and VCSELs have a broad linewidth and are generally low cost. In various embodiments, pure AM may be used for signal modulation through the use an external modulator with a wide variety of lasers, as are known in the art.

Regardless of how the AM and/or FM signal is generated, the frequency modulation is responsible for the different states that are converted to different frequencies, whereas the amplitude modulation is responsible for separating the different states in amplitude, thereby conveniently supplying further information of the different states as conventional systems do not include.

The different frequencies, i.e., the different states, are separated by a frequency separation, also called a FM shift. Thus, the FM shift is defined as the frequency separation between the two states of the frequency modulated (FM) signal. As an example, the FM shift is the difference between the "0"-states and the "1"-state of the combined AM-FM signal, i.e., the optical signal.

Figure 6:
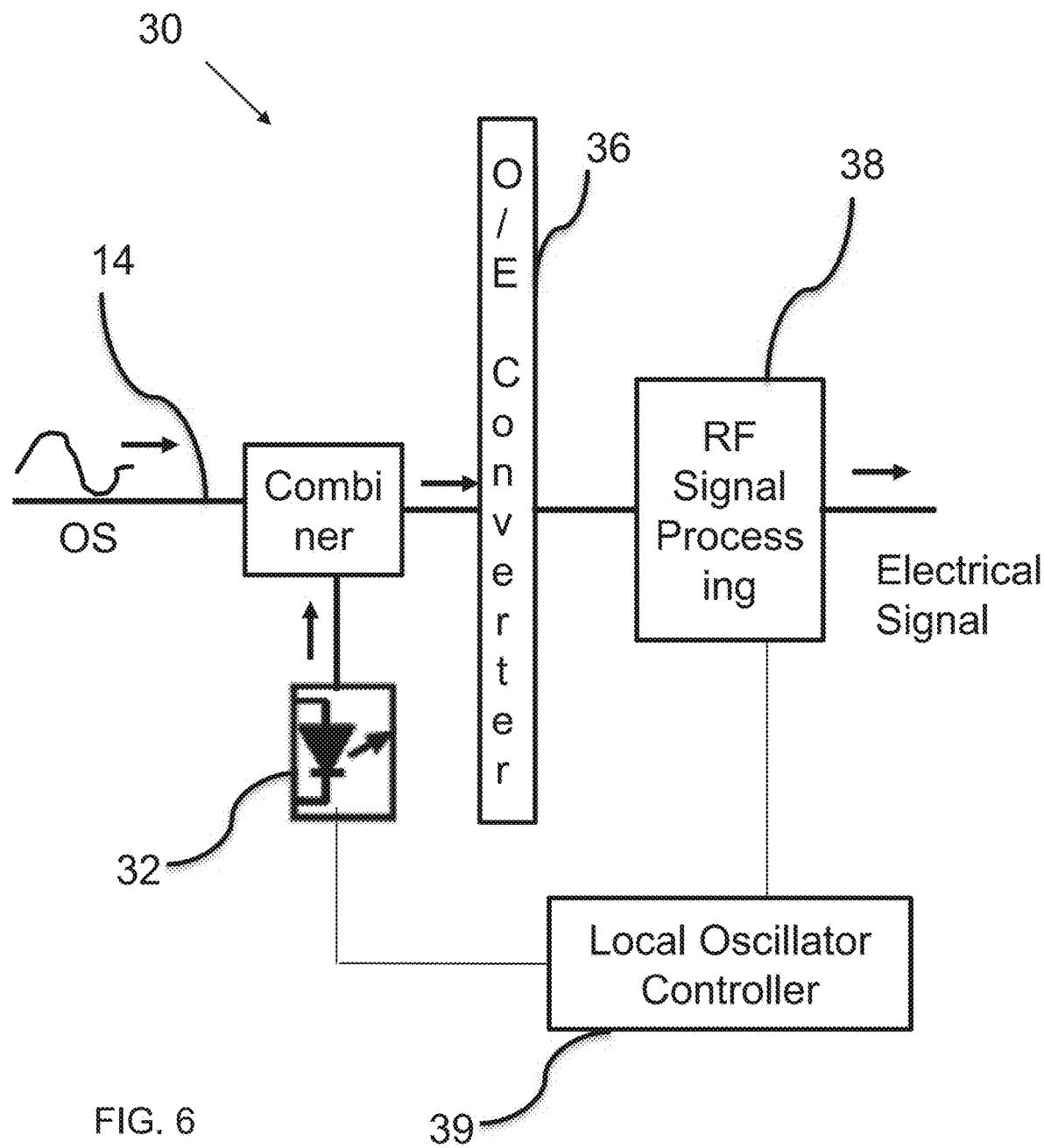
FIGS. 6-12 show exemplary optical receiver embodiments.

FIG. 6 show exemplary embodiments of optical receivers 30 that may be employed in the OTRx 24 separate from the optical transmitter or as part of a transceiver to receive the optical signal (OS). In addition, it will be appreciated that other optical receivers used in the optical system 10 may be different from the embodiments shown in FIG. 6 and may be used with or without embodiments of the present invention.

The optical receiver 30 generally may include one or more fixed or tunable local oscillator ("LO") optical sources 32, such as lasers of various linewidths, to provide LO light at one or more local oscillator center frequencies, which may offset from the center frequency of the optical signal, i.e., the LO frequency offset. The optical local oscillator laser (LO) emitting light at an optical frequency (Flo) which is offset from the optical signal center frequency (Fc) by frequency-offset, or frequency difference, (dF), which may also be referred to as the intermediate frequency, IF. The frequency difference dF is the frequency of the RF electrical signal that has been down-converted from the optical signal. The LO light will generally occupy a narrow frequency spectrum relative to the optical signal which is carrying the information through system 10 and the information will be down-converted on the RF electrical signal.

In various embodiments, the local oscillator(s) 32 may be a cooled or uncooled laser, such as a VCSEL, DFB, DBR, ECL or other type of laser. The local oscillator 32 may be tuned to a frequency or a wavelength of the signal. This can either be an in-band or an out-of-band configuration. In an in-band configuration, the LO is tuned to a frequency or wavelength within a spectrum of the signal. In an out-of-band configuration, the LO 32 is tuned to a frequency or wavelength outside a spectrum of the signal. In this way, wavelength selectivity may be achieved using the local oscillator 32. Using the local oscillator 32 as a wavelength selector enables the system to operate with or without optical filters.

A combiner 34 combines an incoming optical signal OS with the LO light and outputs one or more combined optical signals to a corresponding number of optical-to-electrical (OE) converters 36, such as photodiodes. The OE converters 36 down-convert the optical signal including the information and other signal features, e.g., bandwidth, distortions, etc., to an RF electrical signal with a center frequency at the center frequency difference between the optical signal and the local oscillator light. The RF electrical signal is electrically processed by electrical processing unit 38 that recovers the information as will be further described herein.

In various embodiments a local oscillator controller 39 may be employed to control the local oscillator center frequency based on various receiver performance parameters and user input as described herein. The local oscillator center frequency may be controlled by monitoring the frequency of the local oscillator light output by the local oscillator(s) 32 and various receiver and signal parameters/metrics at various points in the receiver, such as in the electrical processing unit 38, by calculating bit error rate, signal power, signal frequency, etc.

The local oscillator controller 39 may integrated with or separate from the local oscillator(s) 32 and employ one or more processors and associated storage/memory to execute instructions to vary the local oscillator center frequency as described herein. The instructions may be stored in one or more transitory and/or non-transitory computer readable media locally in or proximate to the receiver and/or remotely in the system 10 in communication with the controller.

The combining of the optical signal and local oscillator, and splitting of the combined optical signal if a design requires more than one combined signal, may be provided as integrated or separate combiners 40 and splitters 42 in the receiver 30 recognizing that separate devices may involve higher losses. The combiners 40 and splitter 42 may be implemented as polarization or non-polarization maintaining device using free space or fiber optics or combinations thereof. Also, the combiner 34 may be provided as a passive coupler, such as a 50/50 coupler or other combining ratio, or as a wavelength dependent device. The splitter 42 may be a polarization beam splitter (PBS) to split the combined optical signal provided by the combiner 40 into orthogonally polarized combined optical signals. In each axis, the optical data signal and the LO signal are therefore polarization aligned. Given the unknown polarization of the incoming optical signal, the detected signals in design employing more than one OE converter 36 may need to be combined after photodetection to fully recover the information carried by the incoming optical signal. In embodiments employing only one OE converter 36, it may be desirable to provide the local oscillator light in other than a linearly polarized form, e.g. depolarized, orthogonally polarized, etc., to ensure good mixing with the optical signal.

Figure 7:
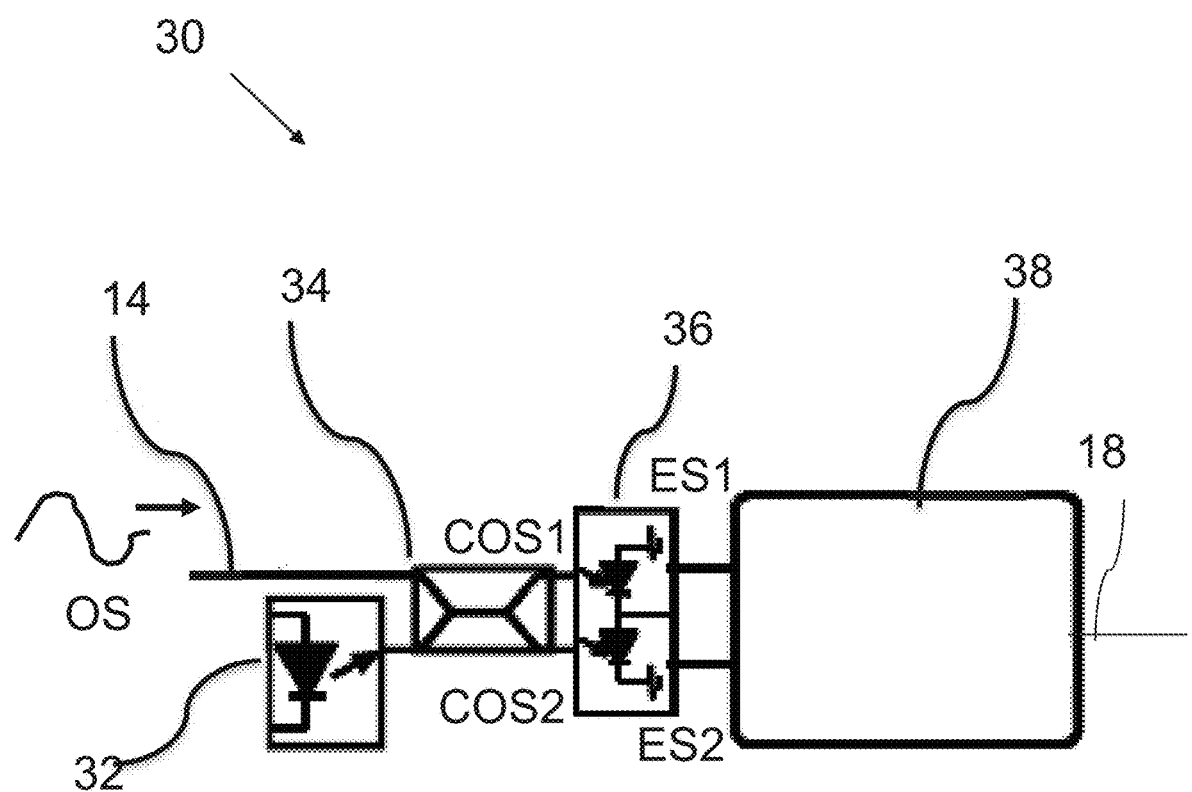
Figure 8:
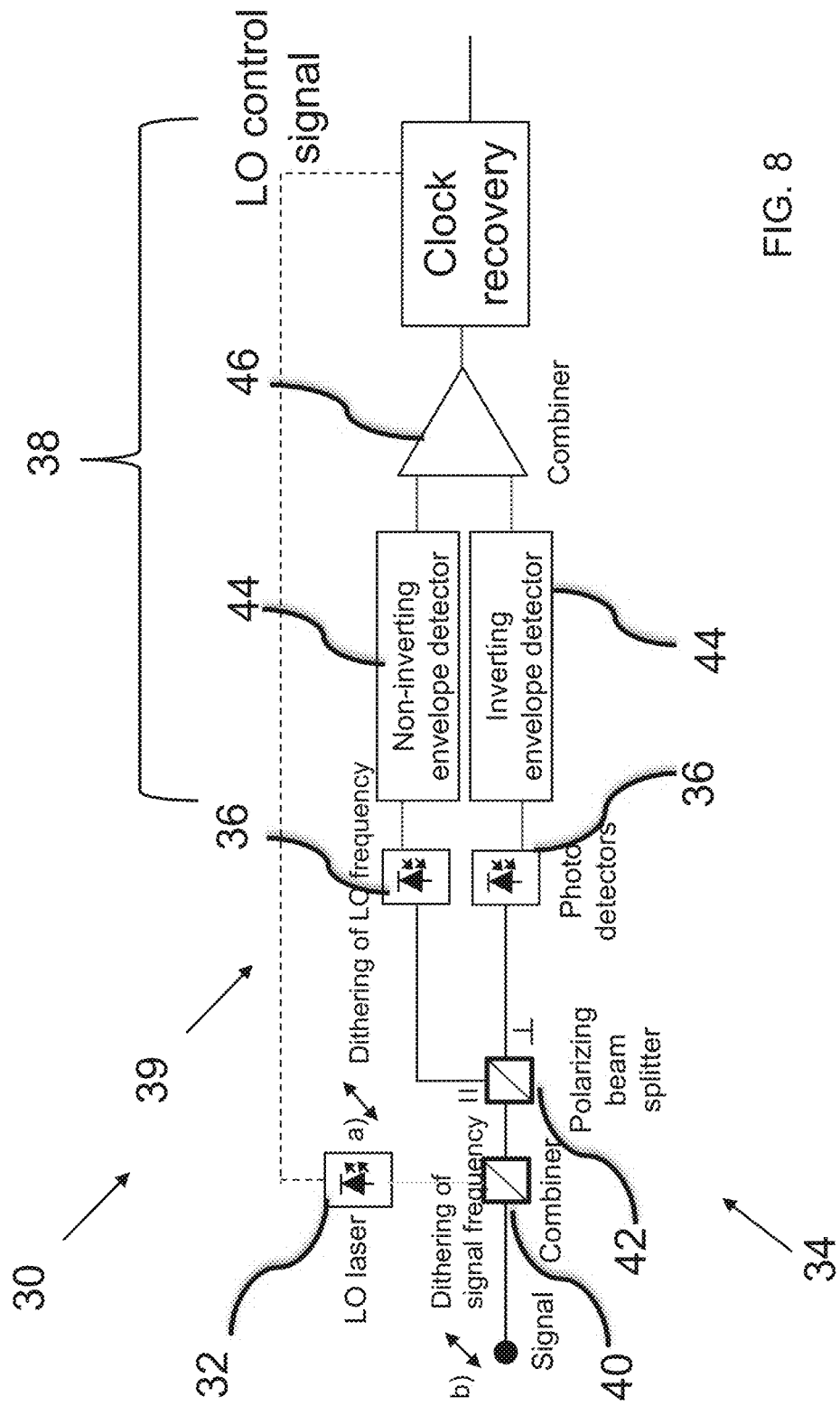

FIGS. 7 and 8 show exemplary receiver embodiments employing more than one OE converter 36 to receive the optical signal. FIG. 7 shows optical receiver embodiment employing a 2×2 combiner/splitter 34 to provide two combined optical signals, COS1 and COS2, to two OE converters 36 that output corresponding RF signals at the frequency of the LO frequency offset, e.g., ES1 & ES2. The corresponding electrical signals may be provided to electrical processing unit 38 that may rectify and output the information as an electrical signal on output line 18 for further signal processing in the receiver and/or further transmission in or out of the system 10.

Exemplary optical receivers 30 that employ two or more optical-electrical converters 36 and various electrical signal processing functionality to process the optical signals (OS) are described in U.S. patent application Ser. No. 15/927,792 filed on Mar. 21, 2018, now U.S. Pat. No. 10,367,588, U.S. patent application Ser. No. 16/459,604 filed on Jul. 1, 2019, now U.S. Pat. No. 10,608,747, and U.S. Provisional Patent Application Ser. No. 62/474,599 filed Mar. 21, 2017, as well as other references, such as ENNING B ET AL: "Signal processing in an optical polarization diversity receiver for 560-Mbit/s ASK heterodyne detection", JOURNAL OF LIGHTWAVE TECHNOLOGY, IEEE SERVICE CENTER, NEW YORK, N.Y., US, vol. 7, no. 3, 1 Mar. 1989 (1989-03-01), pages 459-464, XP011479323, ISSN: 0733-8724, DOI: 10.1109/50.16881, all of which are incorporated herein by reference in their entireties.

FIG. 8 shows various optical receiver 30 embodiments in which two OE converters 36 and electrical processing unit 38 for a 10 Gbps (NRZ) bit rate may be implemented with a 40 GHz bandwidth. The OE converter 36 bandwidth may be referred to as the channel bandwidth of the receiver. The optical signal frequency may be anywhere within the allocated wavelength channel, which allows for variation due to signal bit rate and bandwidth, chirp, and drift due to aging and temperature variation and transmitter to transmitter variations in TDM, WDM, and TWDM systems.

In various embodiments, the electrical signal processor 38 may include a rectifier 48 and combiner 50. Rectification may be applied digitally or analogically. Using a rectifier may provide reduced computational complexity and/or hardware and accordingly reduced overall cost. For example, the rectifier may be used without an analog/digital (A/D) converter. Rectification may be performed as half-wave rectification such that either the positive or negative part of the signal is removed. Half-wave rectification may be possible with a gate with a non-linear transfer function. A gate may be biased such that the e.g., negative part of the signal is lower than the threshold of the gate. Rectification may also be performed as full-wave rectification such as a squaring element, where all negative values are converted to positive values and may be implemented in hardware or software. When implemented in software, an analogue/digital converter may be implemented before processed in a digital signal processer (DSP). Various other solutions may however be possible. Examples of analogue rectifiers include XOR gates, and diode bridges. Both the XOR gates and the diode bridges allow for real-time signal processing without DSP and may thus be preferred over a DSP.

As shown in FIG. 8, the rectifiers 48 may be implemented as envelope detectors 48. A first envelope detector/rectifier 48A converts the first electrical signal from one of the photodiodes to a non-inverted non-return-to-zero (NRZ) data signal. A second envelope detector/rectifier 48B converts the second electrical signal from the other photodiode to an inverted NRZ data signal. The inverted and non-inverted electrical signals are combined to provide the electrical data signal. The combiner 50 may be a differential amplifier that performs a subtraction to recombine the signal or other subtractors as may be known in the art. The combined electrical signal may then be further processed by the optical receiver 30 and/or further transmitted in or out of the system 10.

Figure 9:
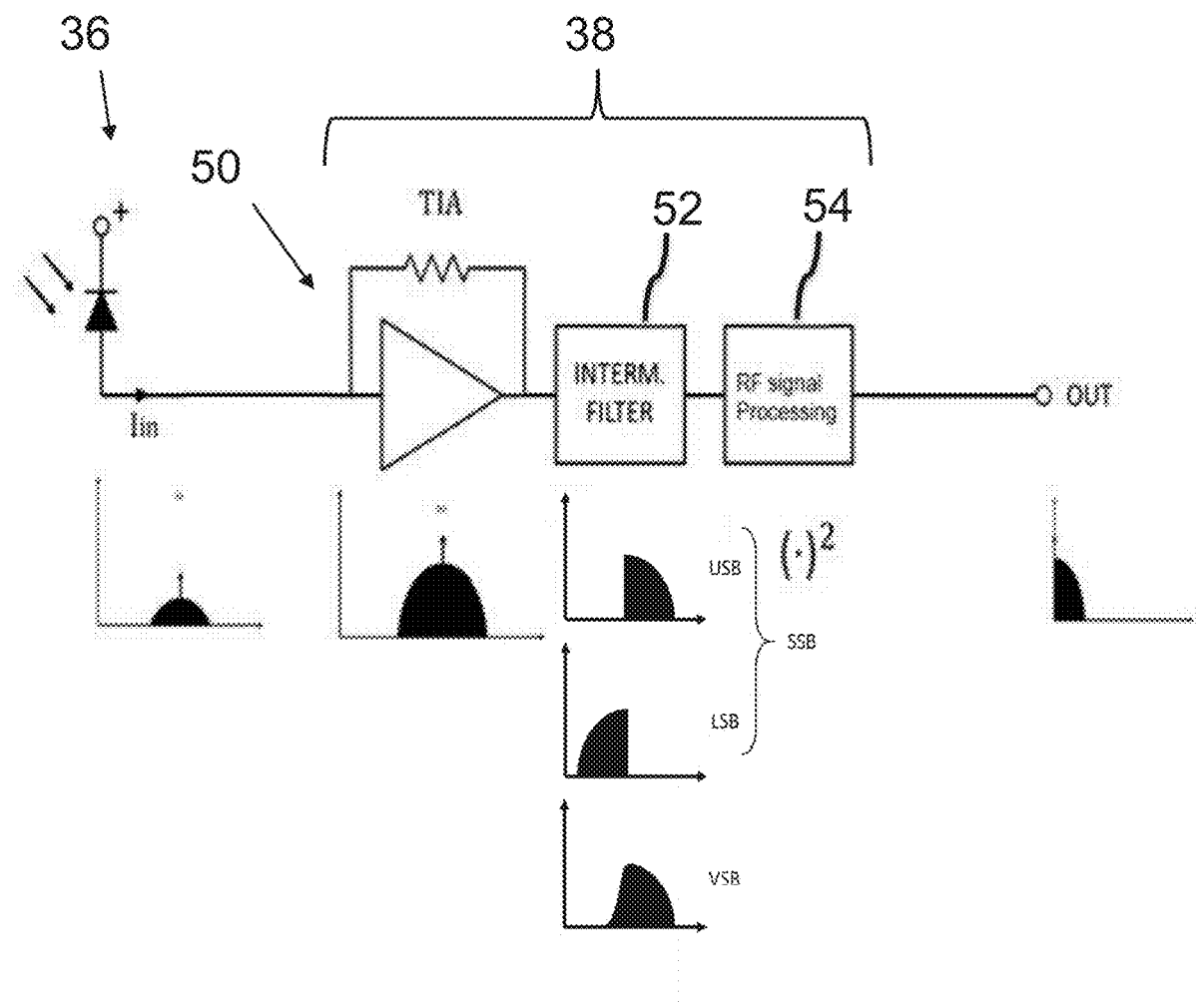

FIG. 9 shows exemplary aspects of the optical receiver 30 that may be employed in an optical communication system 10, in which optical double sideband signals are transmitted by one or more optical transmitters. The optical receivers may employ optical heterodyne detection to produce an electrical radio frequency double side band signal having an upper and lower sideband.

A combined optical signal (information carrying optical signal combined with the local oscillator light) may be received by the optical-electrical converter 36, such as a photodiode, to produce a RF signal carrying the information with a center frequency at the optical signal-LO frequency difference (IF). The electrical processing section 38 may include a transimpedance amplifier (TIA) 50 to shape the electrical signal. For example, the TIA 50 may exhibit a higher cutoff frequency where the gain will drop from that of the low frequency values. The specific cutoff frequency and slope of the rolling-off transfer function will depend on the particular TIA implementation (topology, number of stages, IC technology, packaging and parasitics, etc.). The TIA 50 roll-off may be used to at least partially suppress the upper sideband of the RF signal by placing the RF signal center frequency (IF) near the cutoff frequency of the TIA. In this way, the VSB/SSB filtering may be provided by the roll-off of the TIA 50 with no need for additional VSB/SSB filters. The frequency of the light emitted from local oscillator(s) 32 may be controlled to maintain and/or adjust the RF signal center frequency relative to the cutoff frequency of the TIA 50.

An intermediate electrical filter 52, such as a highpass, bandpass, or lowpass filter (HPF/BPF/LPF), having one or more passbands or stopbands may be used to substantially remove or remove one of the two sidebands of the electrical signal to yield either a vestigial sideband signal (VSB) or a single sideband signal (SSB), respectively. The VSB/SSB electrical signal output from the intermediate electrical filter 52 is provided to an additional electrical processing section 54 as discussed. While the substantial elimination of one of the sidebands removes a portion of the information carrying signal, the inventors has found that substantial elimination of one sideband in the receiver may reduce the negative impact of optical transmission impairments on the performance of the receiver and the system.

FIG. 9 also depicts the general shape of the signal as it passes through the components of the receiver. The different signal shapes shown below the intermediate filter 52 depict the different signals that are produced using the different filter types. It will be appreciated that the intermediate filter 52 can be implemented using one or more filters to achieve the desired signal shape. Together with the transfer function of the TIA 50, the intermediate filter 52 allows USB/LSB/VSB operation.

Figure 10:
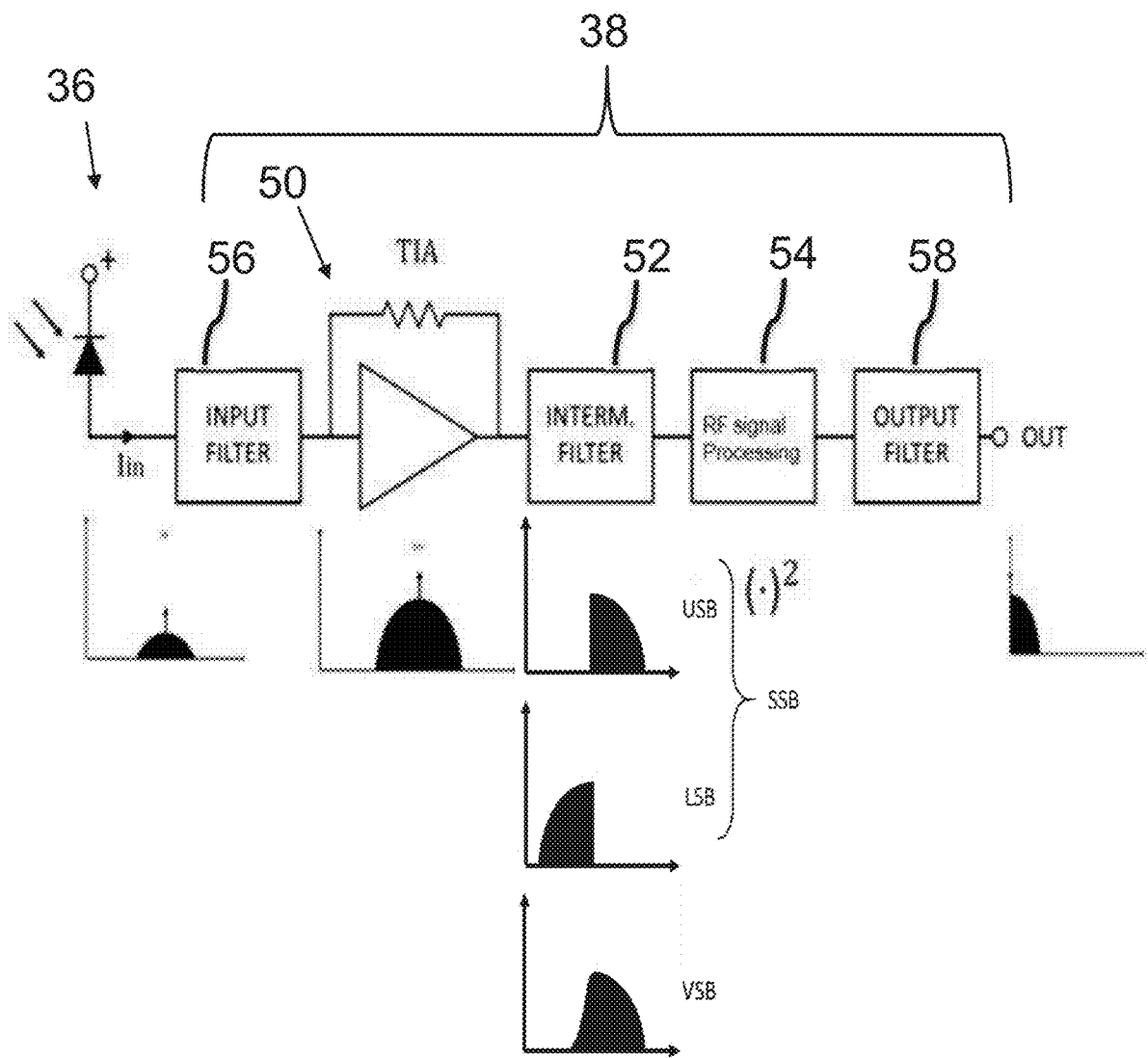

FIG. 10 shows embodiments in which the electrical processing section may include additional filters, such as one or more input filters 54 and/or output filters 56. A high-pass filter (HPF) or a band pass filter (BPF) can be implemented at the input of the TIA 50, since the input photocurrent has a bandpass characteristic (around the difference frequency dF). This also allows sinking of the generated DC photocurrent (DC offset compensation). The lower cutoff frequency and filter shape may be optimized for USB/VSB operation. By selecting an IF close to the filter cutoff, the lower sideband is effectively suppressed. In practice, the input HPF may be integrated with the TIA on the same component.

The output filter 56 may be used to select a demodulated baseband signal. The filter 56 is typically implemented as one or more LPFs that may be also tailored to further shape the signal being output.

Figure 11:
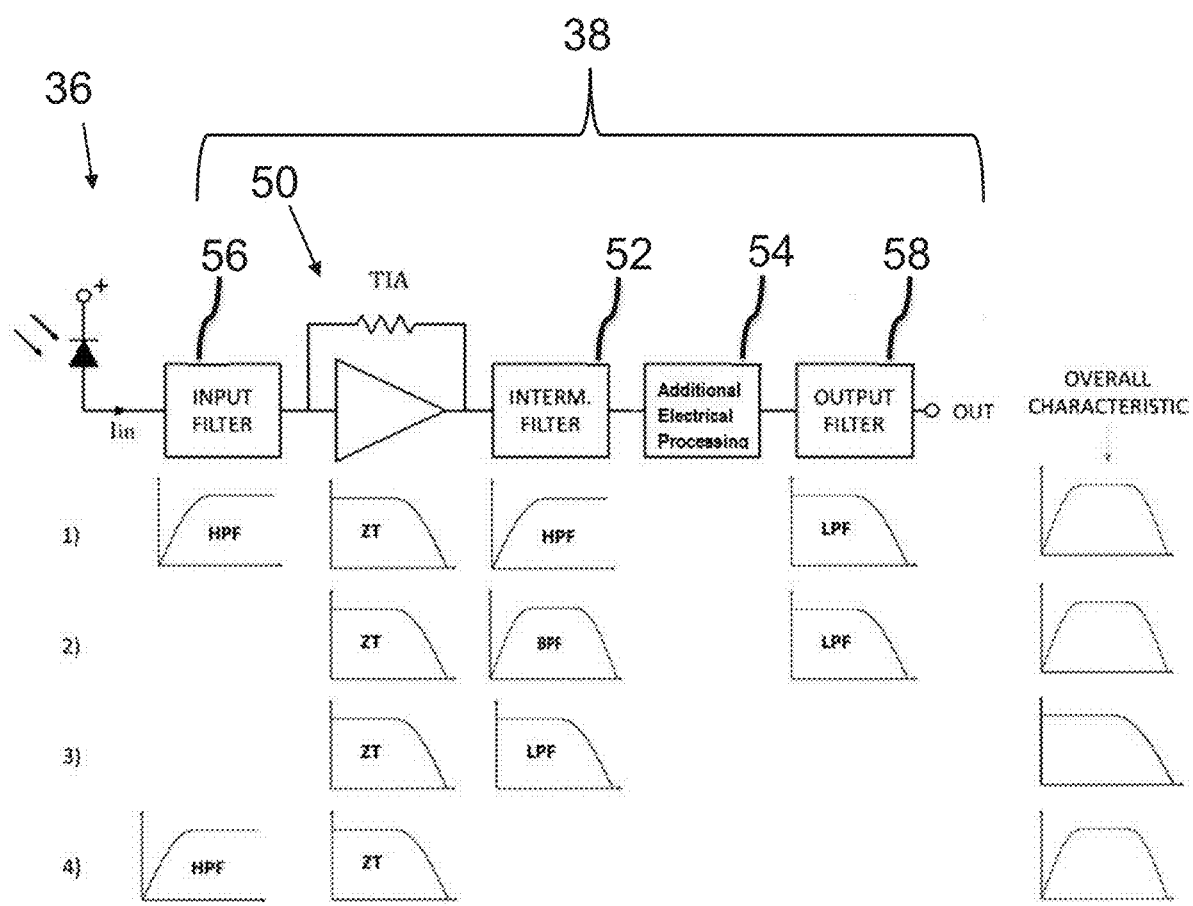

FIG. 11 depicts various options that may be embodied in embodiments, such as shown in FIG. 10. Options 1, 2, 4 support USB/LSB/VSB operation. Option 3 supports upper sideband suppression only.

The retained part of the spectrum after VSB filtering still contains the phase information of the received signal, so the impairments of chromatic dispersion are not completely removed, though significantly alleviated. As chromatic dispersion is a well understood phenomenon, knowing the distance of the transmitter allows a fairly precise calculation of the phase distortion introduced by the fiber. For instance, in most practical applications, where the operating wavelength is around 1550 nm, the dispersion coefficient is D≈17 ps/(nm·km), which translates in D≈−0.2 ps/(GHz·km) in the frequency domain.

In an optical heterodyne receiver, the latter definition of the dispersion coefficient is particularly useful for quantifying the phase distortion of the IF signal due to chromatic dispersion. This also provides the specifications for the design of electrical chromatic dispersion compensator (ECDC) to compensate for chromatic dispersion and other signal distortion effects in the electrical domain after heterodyning.

Figure 12:
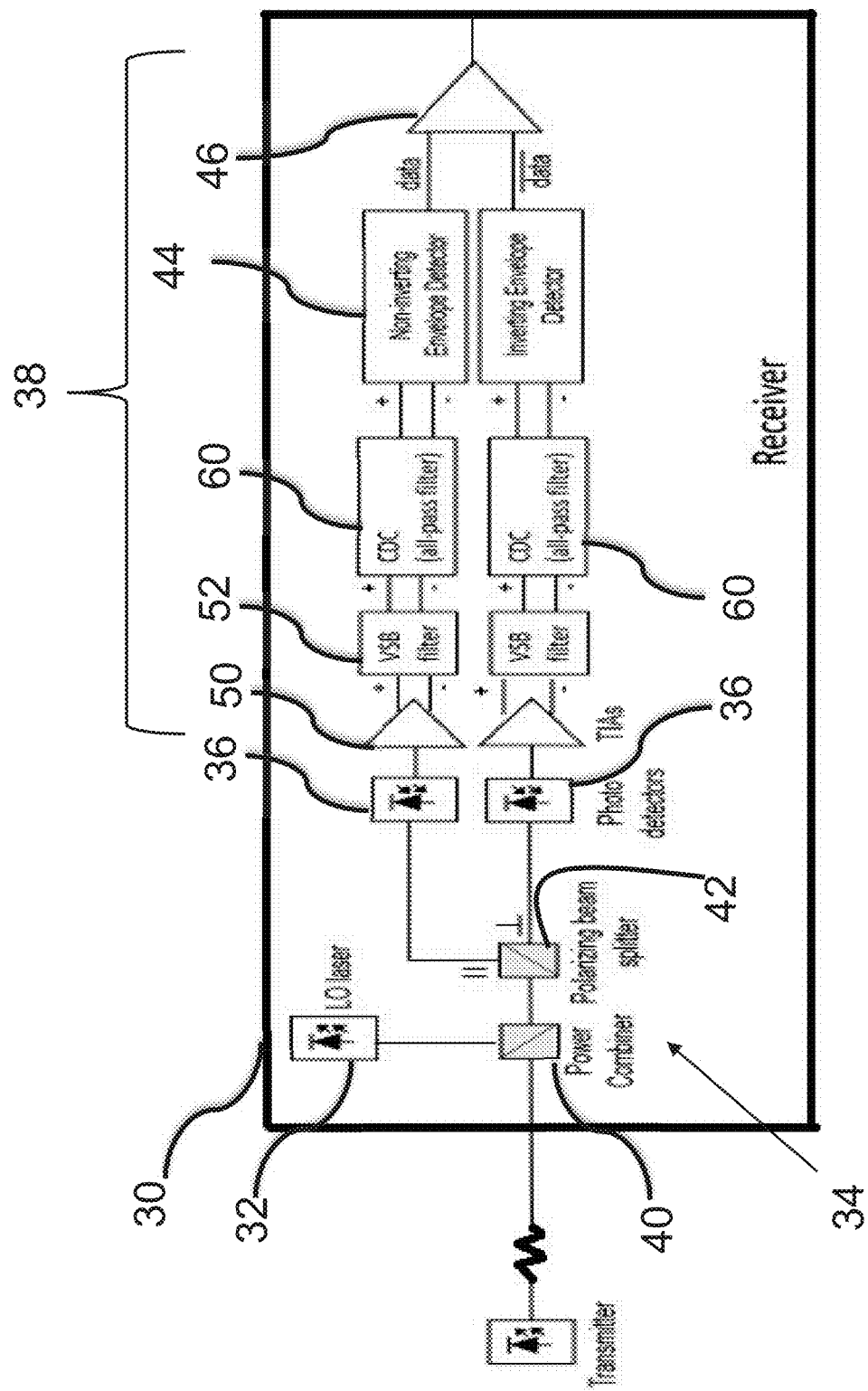

For example, an analog all-pass filter 60 may be employed that acts only on the phase of the IF signal and not affecting its amplitude and has a specified phase response opposite the dispersion coefficient. As shown in FIG. 12, the ECDC 60 may be placed just after the intermediate filter 52 and before signal rectification, such as in FIG. 8. Alternatively, it can be placed before the intermediate filter 52, or the intermediate filter 52 can be designed to have the desired group delay characteristic and thereby perform the functionality of the intermediate filter 52 and the ECDC 60 in a single component.

Figure 13A:
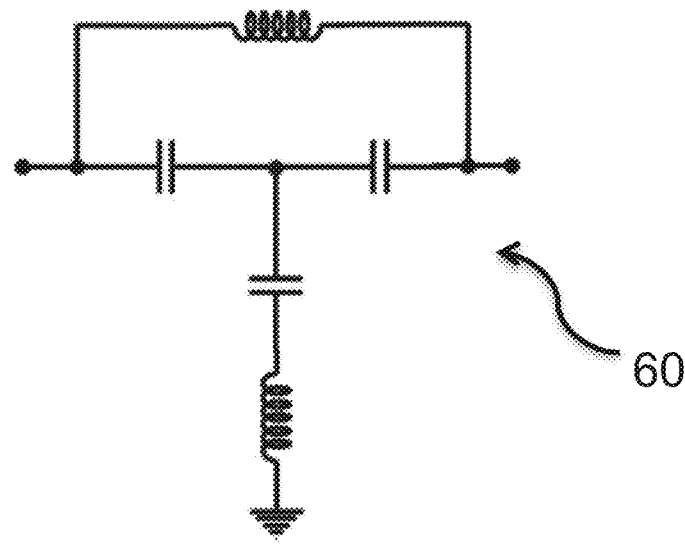
FIGS. 13A & 13B show exemplary all-pass filters and frequency response, respectively.
Figure 13B:
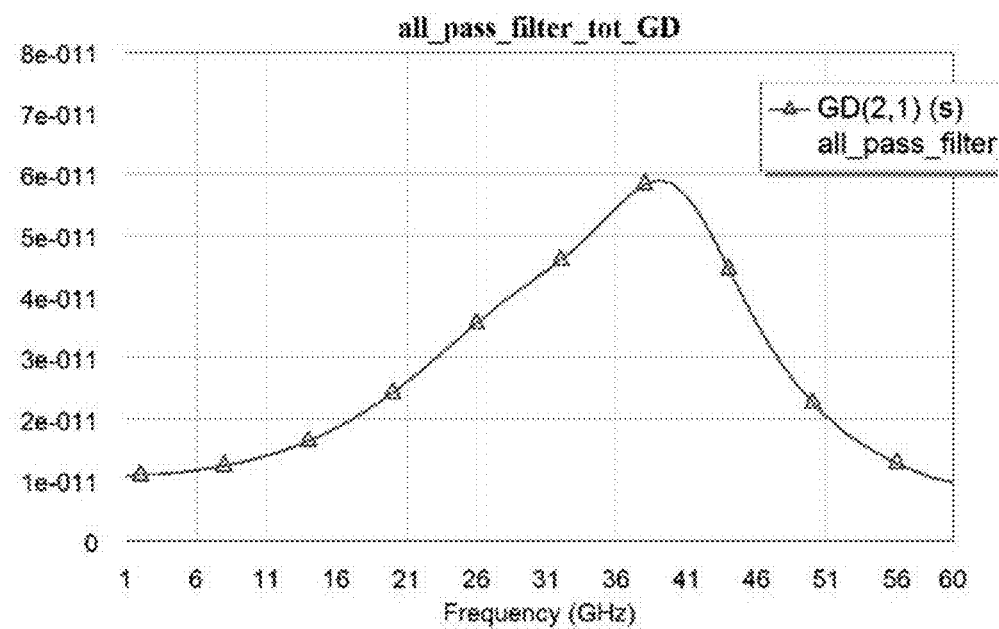

FIG. 13A shows exemplary embodiments of all-pass filter 60 that may be employed consisting of an LC network which can be tuned to have a group delay (GD) variation, such as shown in FIG. 13B. The slope of the group delay as a function of frequency may be designed to be GD(f)=2 ps/GHz in the range 20-38 GHz for uses with SSMF Other all-pass filter designs may be employed by the skilled artisan, see, for example, "Design of cascaded all pass network with monotonous group delay response for broadband radio frequency applications", IET IET Microwaves, Antennas & Propagation, 2016, Vol. 10, Issue 7, pp. 808-815, which is incorporated herein by reference.

According to the known value of the dispersion coefficient D at 1550 nm, this GD profile is well suited to compensate the chromatic dispersion occurring in a 10-km fiber link. In addition, simulation results show that the filter 60 may be further tuned to compensate for other distances. Tuning of the filter 60 may be performed by varying the impedance of one or more components in the filter as is known in the art. Control of the filter tuning may be performed by a separate controller based on various receiver performance parameters/metrics and user input and/or may be controlled via the local oscillator controller 39.

Figure 14A:
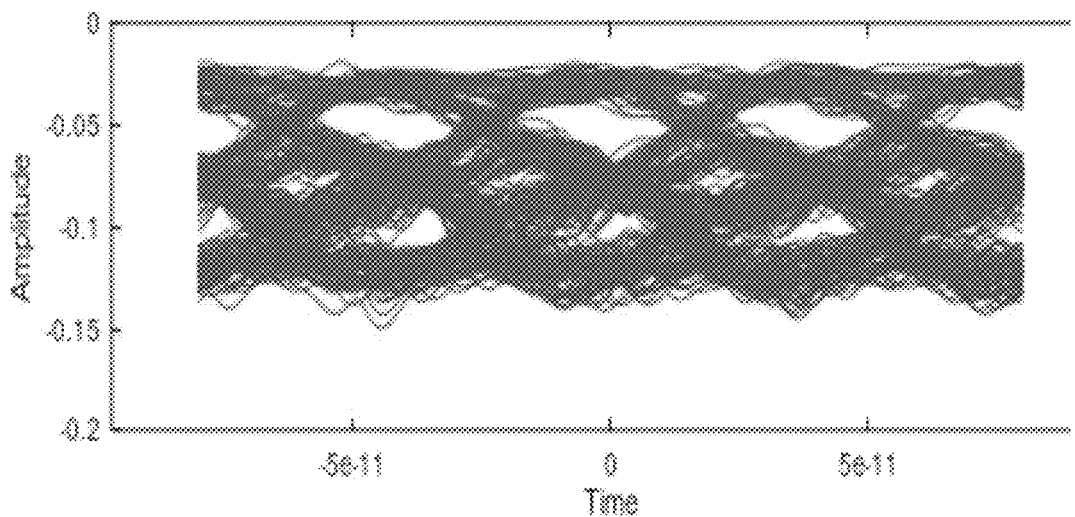
FIGS. 14A & 14B show exemplary receiver eye diagrams.
Figure 14B:
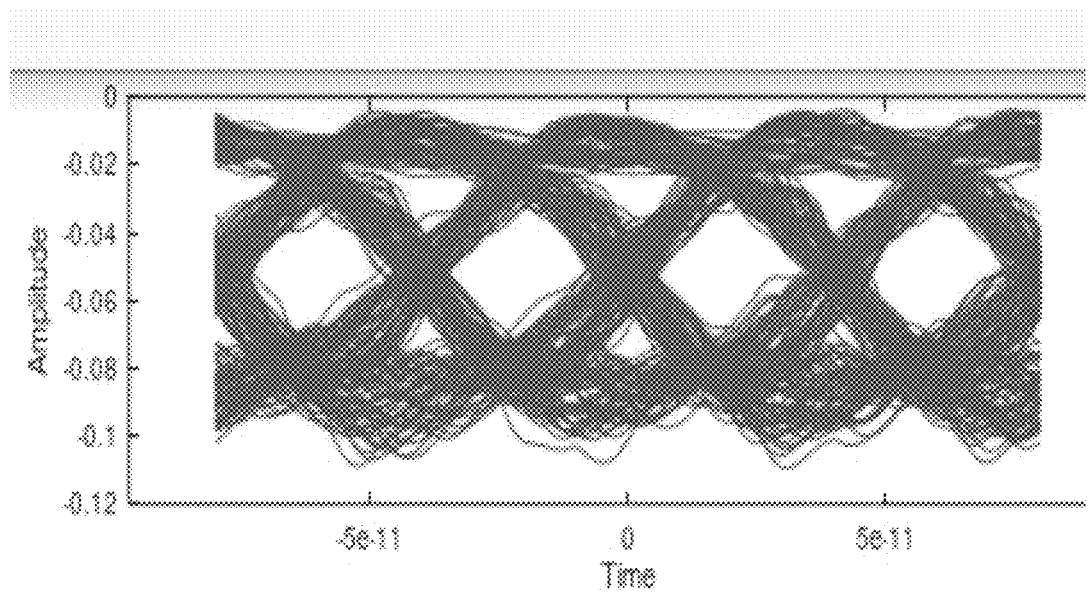

FIGS. 14A and 14B show eye diagrams of a heterodyne receiver operating at 25 Gbps and 30 GHz offset between signal and LO are reported for a 20-km transmission without and with the all-pass filter ECDC 60 of FIG. 13A. As can be seen, the ECDC 60 provides additional eye opening which generally translates to improved system performance.

Unfortunately, all-pass filters are generally limited in that the all-pass filter has to be designed to compensate for a specific amount of dispersion, e.g. a specific length of a specific fiber and tunable over a range of dispersion amounts, so these filters are not generally deployable, but may be designed for specific application ranges. While banks of all-pass filters or adjustable filters may be considered, those solutions may be cost prohibitive for some applications. However, another advantage of VSB/SSB embodiments of the present invention employing ECDC is the removal of some or all of one sideband essentially reduces the signal bandwidth by approximately 50%. As such, the dynamic range of an ECDC 60, such as an all-pass filter is expanded since it only has to compensate for dispersion for approximately 50% of the signal bandwidth compared to a double sideband signal.

In various embodiments, one or more optical receivers 30 may be employed in the optical communication system 10 in which single or double sideband optical signals are transmitted by one or more optical transmitters. The optical receivers 30 may employ optical heterodyne detection and employ a local oscillator controller in or in communication with the local oscillator to adjustably control the frequency difference dF, or intermediate frequency IF, between the center wavelength of the optical signal and the local oscillator light frequency to produce a corresponding electrical RF signal in which a specified group delay variation has been introduced across the bandwidth of the electrical RF signal aiming to compensate for optical transmission impairments, such as dispersion, referred to herein as heterodyne dispersion compensation. While the introduction of signal distortion into the heterodyne signal is counter to the general intent of the optical receivers, the inventors have found that if performed according to the methods and with devices of the present invention, the signal distortion via optical heterodyning may improve the performance of the optical receivers 30 and systems 10.

The local oscillator controller may adjust the IF, and hence the frequency of the RF electrical signal, to match a specified group delay variation characteristic based on optical receiver performance data and/or user input. For example, the user may input a target specified group delay based on the length and fiber type(s) of a transmission link in which the optical receiver is being used. The optical receiver may or may not adjust the specified group delay during operation. For example, the optical receiver could provide performance data, such as bit error rate (BER), via one or more processors to the local oscillator controller that may be used to adjust the specified group delay.

In various optical receiver embodiments employing optical heterodyning, such as embodiments in FIGS. 6-12, the center frequency of the local oscillator 32 may be controlled relative to the center frequency of the optical signal, such the difference frequency dF, results in the introduction of signal distortion in the frequency domain in the down-converted RF signal.

The frequency distortion is in the form a group delay that is generally opposite to the group delay introduced by chromatic dispersion in a fiber link. The frequency dependence of the group delay variation can be non-linear. The chromatic dispersion compensation can therefore be tuned by tuning the frequency difference between the optical signal being received and the local oscillator.

Figure 15:
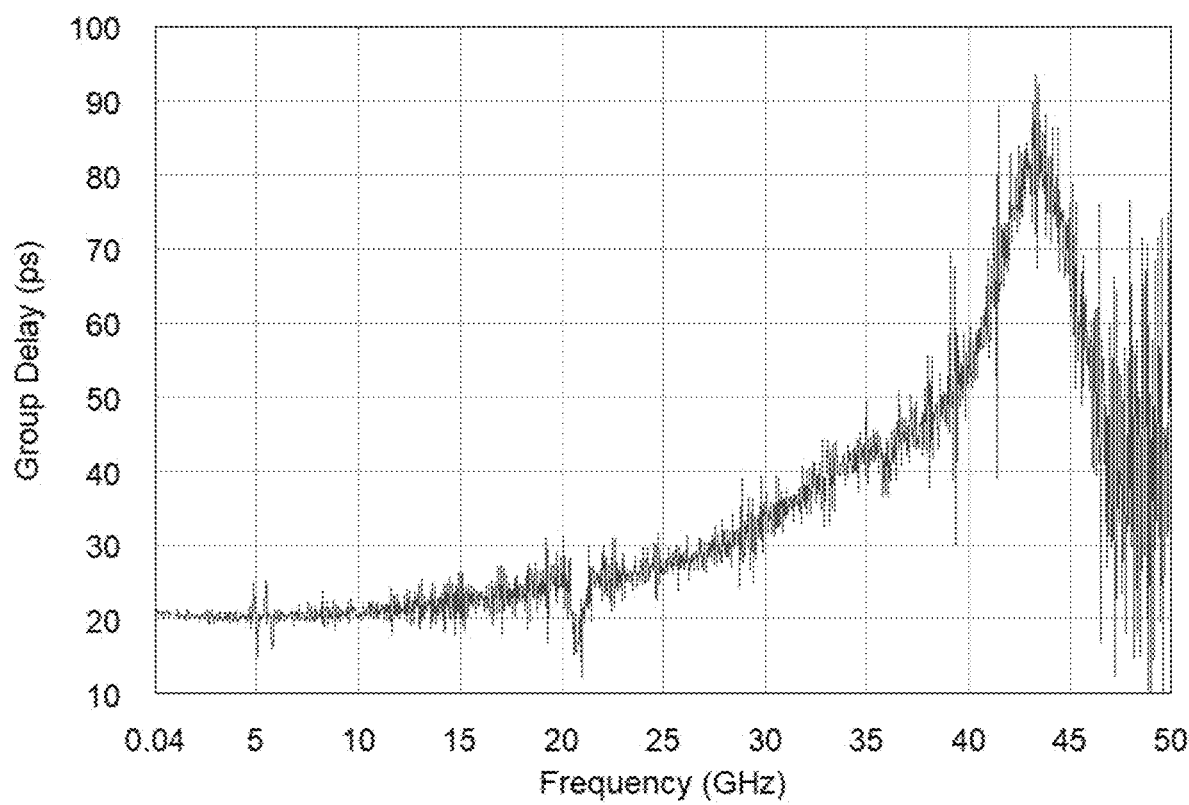
FIG. 15 shows an exemplary group delay versus frequency measurement for an exemplary optical receiver.

FIG. 15 shows the measured group delay of an optical heterodyne receiver. By choosing a frequency offset around 20 GHz, a very flat group delay is observed, which would be suitable for short links or the back to back case. Whereas, choosing instead a frequency offset around 35 GHz results in a steeper group delay variation across the signal bandwidth, which can be tailored to compensate for longer links.

Figure 16A:
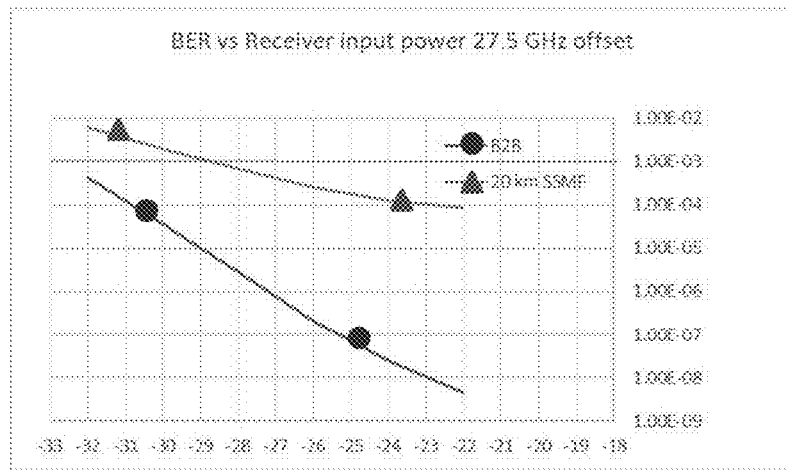
FIGS. 16A-16C show exemplary bit error rate versus receiver input power for difference frequencies of 27.5 GHz, 30 GHz, and 32.5 GHz, respectively.
Figure 16B:
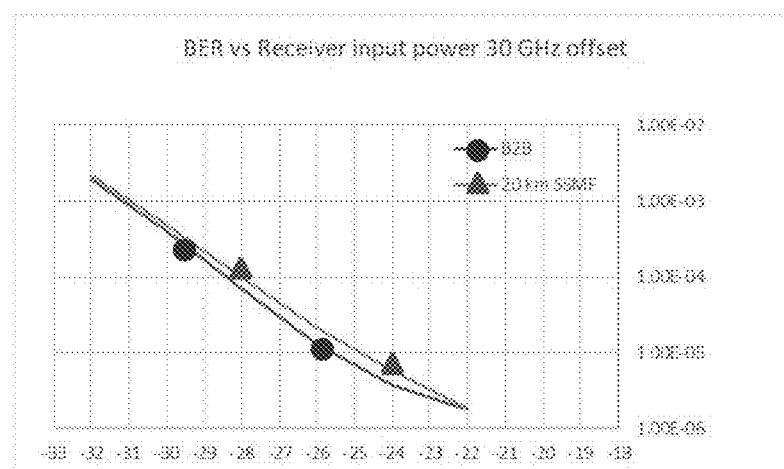
Figure 16C:
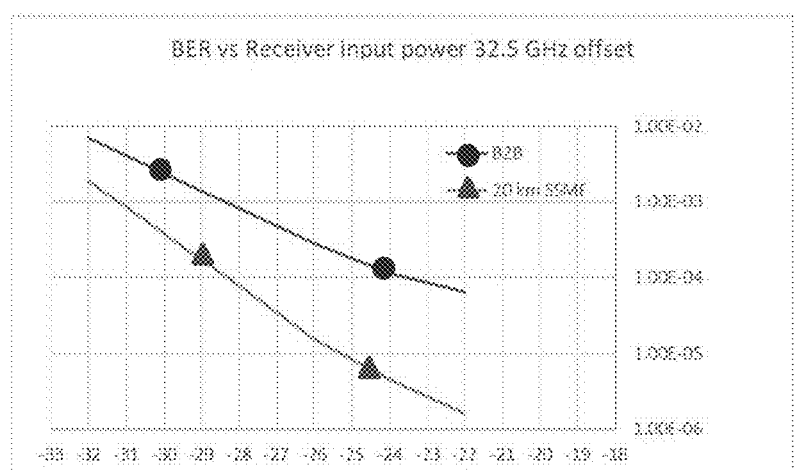

FIGS. 16A-16C show bit error rate (BER) versus receiver input power plots in which the difference frequency was set at 27.5, 30, and 32.5 GHz, respectively, for reception of a 25 Gbps signal transmitted Back-to-Back (B2B) and over 20 km of fiber with a chromatic dispersion of 16 ps/(nm*km) at the center wavelength of the optical signal. In FIG. 16A, the LO is tuned such that the frequency offset is 27.5 GHz. In this case, the back to back performance is clearly superior to the 20 km transmission case. In FIG. 16B, a 30 GHz offset is chosen, which results in similar performance between B2B and 20 km transmission. In FIG. 16C, a 32.5 GHz offset is chosen, giving superior performance to the 20 km transmission case. As can be seen, heterodyne dispersion compensation may be deployed as a tunable chromatic dispersion compensator in heterodyne optical receivers. The compensation may be applied to longer transmission distances, fibers with different dispersion values, and to different bit rates.

Various system and receiver embodiments may include one or both of VSB/SSB filtering and heterodyne dispersion compensation. The optical receivers may include other components that are present in various optical heterodyne receivers, such as may be used in coherent and quasi-coherent optical transmission systems.

In addition, while the various aspects of the present invention provide for lower cost, high performance system, the teachings of present invention may be employed in higher cost systems to improve the performance of such systems. For example, the present invention may be employed with optical systems that include various optical chromatic dispersion compensation devices, such as dispersion compensating fiber (DCF), Bragg gratings, etc.

The foregoing disclosure provides examples, illustrations and descriptions of the present invention, but is not intended to be exhaustive or to limit the implementations to the precise form disclosed. Modifications and variations are possible in light of the above disclosure or may be acquired from practice of the implementations. These and other variations and modifications of the present invention are possible and contemplated, and it is intended that the foregoing specification and the following claims cover such modifications and variations.

As used herein, the term component is intended to be broadly construed as hardware, firmware, and/or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Various elements of the system may employ various levels of photonic, electrical, and mechanical integration. Multiple functions may be integrated on one or more modules or line cards being housed in one or more shelves or racks in the system 10.

Hardware processor modules may range, for example, from general-purpose processors and CPUs to field programmable gate arrays (FPGAs) to application specific integrated circuit (ASICs). Software modules (executed on hardware) may be expressed in a variety of software languages (e.g., computer code), including C, C++, Java™, Javascript, Rust, Go, Scala, Ruby, Visual Basic™, FORTRAN, Haskell, Erlang, and/or other object-oriented, procedural, or other programming language and development tools. Computer code may include micro-code or micro-instructions, machine instructions, such as produced by a compiler, code used to produce a web service, and files containing higher-level instructions that are executed by a computer using an interpreter and employ control signals, encrypted code, and compressed code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more". Furthermore, as used herein, the term "set" is intended to include one or more items and may be used interchangeably with "one or more". Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver comprising:
   at least one local oscillator providing local oscillator light having a local oscillator center frequency;
   an optical combiner having a first input, a second input, and at least one output, the optical combiner to combine an optical signal having an optical signal center frequency provided to the first input and the local oscillator light provided to the second input and provide a combined optical signal to the at least one output,
   an opto-electrical converter having an input optically connected to the at least one output of the optical combiner, and a radio frequency ("RF") electrical signal output, the opto-electrical converter converting the combined optical signal to a RF electrical signal at a RF frequency;
   an electrical filter having an input electrically connected to receive the RF electrical signal having an output, the electrical filter introducing a group delay variation to the RF electrical signal; and
   a rectifier having an input electrically connected to the output of the electrical filter and to rectify the RF electrical signal into a baseband electrical signal carrying the information,
      wherein the local oscillator light center frequency being controlled relative to the optical signal center frequency to control the frequency of the RF electrical signal, so group delay variation in the RF electrical signal is at least partially offset by the group delay variation introduced by the filter.

2. The receiver of claim 1, where the group delay variation corresponds to an amount of chromatic dispersion compensation in an optical fiber link.

3. The receiver of claim 1, where the RF frequency is controlled—based on at least one of receiver performance and user input.

4. The receiver of claim 1, where the electrical filter is an all-pass filter.

5. The receiver of claim 3, where the local oscillator light center frequency is adjusted to reduce bit error rate performance of the receiver.

6. The receiver of claim 1, where the electrical filter is at least one a high-pass filter, a band-pass filter, and a low-pass filter.

7. The receiver of claim 6, where the filter is implemented at least in part via a transimpedance amplifier and the frequency of the RF electrical signal is controlled to filter at least a portion of one of an upper and a lower sideband of the RF electrical signal.

8. The receiver of claim 7, where the local oscillator controller light center frequency is controlled to adjust the performance of the filter relative to the RF electrical signal.

9. A method of receiving an optical signal having a center frequency and carrying information comprising:
   providing, via at least one local oscillator, local oscillator light at a local oscillator center frequency,
   combining, via an optical combiner, the optical signal with the local oscillator light to output a combined optical signal,
   converting, via an opto-electrical converter, the combined optical signal into a corresponding a radio frequency ("RF") electrical signal at an RF frequency having upper and lower sidebands carrying the information,
   filtering, via an electrical filter, the RF electrical signal, the filter introducing a group delay variation into the RF electrical signal;
   adjusting the local oscillator light frequency, so group delay variation in the RF electrical signal is at least offset in part by the group delay introduced by the electrical filter; and rectifying, via a rectifier, the RF electrical signal into a baseband electrical signal carrying the information.

10. The method of claim 9, where
the local oscillator light center frequency is adjusted to reduce a bit error rate measurement of the information.

11. An optical transmission system comprising:
an optical transmitter to transmit an optical signal having a center frequency and carrying information; and
an optical receiver to receive the optical signal, the optical receiver including an optical signal input to receive the optical signal from the transmitter;
  at least one local oscillator providing local oscillator light having a local oscillator center frequency;
  an optical combiner combining the optical signal provided to a first optical input from the optical signal input with the local oscillator light provided to a second input from the at least one local oscillator, and outputting a combined optical signal including the optical signal and the local oscillator light,
  an opto-electrical converter having an optical signal input to receive the combined optical signal from the output of the optical combiner, and output a radio frequency ("RF") electrical signal having a RF frequency equal to the frequency difference between the optical signal center frequency and the local oscillator center frequency;
  a filter electrically connected to the RF electrical signal from the opto-electrical converter to shape the RF electrical signal as a function of the frequency of the RF electrical signal;
  a local oscillator controller to adjust the local oscillator light center frequency to control the frequency of the RF electrical signal, so group delay variation in the RF electrical signal is at least partially offset by the group delay variation introduced by the filter; and
  a rectifier to rectify the RF electrical signal from the filter into a baseband electrical signal carrying the information.

12. The system of claim 11, where
the filter is at least one of a high-pass, bandpass, or low-pass filter to at least substantially remove one of an upper and a lower sideband of the RF electrical signal and to output one of a vestigial sideband signal ("VSB") and single sideband signal ("SSB") RF signal; and
the local oscillator controller further adjusts the local oscillator frequency to control the frequency of the RF electrical signal relative to a passband of the filter.

13. The system of claim 11, where
the filter is an all-pass filter that introduces group delay into the RF signal.

14. The receiver of claim 1, where the filter includes
an intermediate filter electrically connected to the RF electrical signal output to at least substantially remove one of an upper and a lower sideband of a RF electrical signal from the RF electrical signal output and to output one of a vestigial sideband signal and single sideband signal RF electrical signal.

15. The method of claim 9, where filtering includes
filtering, via an intermediate filter, the RF electrical signal to at least substantially remove one of an upper and a lower sideband of the RF signal and to output one of a vestigial sideband signal and single sideband signal RF signal.

16. The receiver of claim 1, where the group delay variation introduced by the electrical filter is monotonous over a RF frequency range.

17. The receiver of claim 16, where the monotonous group delay variation is 2 ps/GHz.

18. The receiver of claim 1, where the group delay variation introduced by the electrical filter is nonlinear over a RF frequency range.

19. The receiver of claim 18, where the group delay variation introduced by the electrical filter has a steeper variation at 35 GHz than at 20 GHz.

20. The receiver of claim 1, where at least part of the group delay variation in the RF electrical signal is a result of chromatic dispersion of the optical signal.

* * * * *